(12) United States Patent
Tandy, Jr. et al.

(10) Patent No.: US 7,512,472 B2
(45) Date of Patent: *Mar. 31, 2009

(54) COMPUTER PROGRAM FOR STABILITY ENHANCING SYSTEM FOR PRIME MOVER AND AUXILAIRY VEHICLE

(75) Inventors: Donald Frank Tandy, Jr., The Woodlands, TX (US); Donald Frank Tandy, Sr., Beavercreek, OH (US)

(73) Assignee: Tandy Engineering & Associates, Inc., The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/416,972

(22) Filed: May 3, 2006

(65) Prior Publication Data
US 2007/0260387 A1  Nov. 8, 2007

(51) Int. Cl.
*B60T 13/00* (2006.01)

(52) U.S. Cl. .................. 701/70; 340/431; 340/465; 280/418.1; 280/423.1

(58) Field of Classification Search .............. 701/70, 701/71, 78, 41; 340/431, 438, 465, 671; 180/233, 410, 412; 280/432, 418.1, 423.1; 303/140; 73/129; *B60T 13/00*
See application file for complete search history.

(56) References Cited

U.S. PATENT DOCUMENTS

| | | | |
|---|---|---|---|
| 5,747,683 A * | 5/1998 | Gerum et al. .............. 73/118.1 |
| 5,990,788 A | 11/1999 | Syracuse .................... 340/458 |
| 6,042,196 A | 3/2000 | Nakamura ...................... 303/7 |
| 6,450,019 B1 * | 9/2002 | Wetzel et al. ................. 73/129 |
| 6,516,925 B1 * | 2/2003 | Napier et al. ............ 188/112 A |
| 6,668,225 B2 * | 12/2003 | Oh et al. ........................ 701/70 |
| 6,806,809 B2 * | 10/2004 | Lee et al. ..................... 340/431 |
| 6,843,599 B2 * | 1/2005 | Le et al. ...................... 378/198 |
| 6,957,873 B2 | 10/2005 | Wanke ........................ 303/140 |
| 7,413,266 B2 * | 8/2008 | Lenz et al. ................... 303/150 |
| 2001/0027892 A1 * | 10/2001 | Masters et al. .............. 180/403 |
| 2002/0095251 A1 * | 7/2002 | Oh et al. ........................ 701/70 |
| 2003/0160428 A1 * | 8/2003 | Lindell et al. ................ 280/432 |
| 2004/0021291 A1 * | 2/2004 | Haug et al. ............... 280/455.1 |
| 2006/0173584 A1 * | 8/2006 | Einig et al. ...................... 701/1 |
| 2006/0187008 A1 * | 8/2006 | Yu ............................... 340/431 |
| 2006/0244579 A1 * | 11/2006 | Raab .......................... 340/438 |
| 2007/0145809 A1 * | 6/2007 | Timoney et al. ........... 298/22 P |

* cited by examiner

*Primary Examiner*—Tuan C To
(74) *Attorney, Agent, or Firm*—Buskop Law Group, PC; Wendy Buskop

(57) ABSTRACT

A computer readable medium for instructing the steps of a method for providing stability, control and management of a prime mover connected to an auxiliary vehicle is disclosed. A plurality of computer instructions is stored on a computer readable medium and executed by a processor to perform the steps of connecting the auxiliary vehicle to the prime mover with an electronic stability enhancing system and an auxiliary stability enhancing system, including the processor and memory. The computer instructions instruct communication between the processor and a plurality of sensors regarding forces, motions, and combinations thereof, and communications with a database storage containing specifications representing the prime mover and auxiliary vehicle for comparisons to preset threshold values. Computer instructions and a computer model provide calculated responses to be selectively applied to reduce the detected force and motion values that exceed the threshold values for the prime mover connected to the auxiliary vehicle.

20 Claims, 1 Drawing Sheet

COMPUTER PROGRAM FOR STABILITY ENHANCING SYSTEM FOR PRIME MOVER AND AUXILAIRY VEHICLE

FIELD

The present embodiments relate generally to computer instructions on computer readable media for performing a method to assist with control, stability, and management of a prime mover connected to an auxiliary vehicle.

BACKGROUND

Safety systems for vehicles have evolved through the years and have been improved upon by enhancements such as intervention into the suspension, steering, brakes, or engine management of the driving engine for the vehicle. Such enhancements include: traction slip control to prevent the spinning of the wheels of the vehicle, brake force proportioning to regulate the ratio of brake forces between the front axle and rear axle of the vehicle, anti-lock brakes, and electronic stability control which can affect driving conditions of the vehicle during yawing of the vehicle about its vertical axis.

In electronic stability control systems for vehicles, it is necessary to be able to assess the behavior of the vehicle, particularly if the assessment and any response can be accomplished in real time. These systems that assess vehicle motion, accomplish this assessment in real time and rely on the ability to monitor the movements of the vehicle by installing sensors to measure the acceleration of the vehicle and the angular rotational rates of the vehicle.

During normal driving, the vehicle responds to the driver's commands, and the driver maintains control of the vehicle. However, if the driver operates the vehicle beyond his/her limits or even the limits of the vehicle, the vehicle can exhibit a spin response as a yaw movement in excess of that required for the situation, or a plow response as a yaw movement less than that required for the situation. A system such as the Electronic Stability Program (ESP) can provide some correction to the motions of the vehicle in certain situations by using mathematical models that consider the vehicle dynamics and forces of the tires of the vehicle along with measurements supplied by sensors recording vehicle speed, yaw rate, and actions of the driver of the vehicle, such as the steering wheel and the application of the brakes and accelerator.

However, the use of Electronic Stability Program mathematical models can have some limitations with respect to how much a motion can be corrected or whether a driver will respond appropriately. In addition, such systems function by observing movements of the body of the vehicle, only, and do not extend to any auxiliary vehicle, such as a trailer connected to the vehicle. Accordingly, all forces affecting the performance of a combination vehicle and trailer would not be included in the mathematical model of the Electronic Stability Program as the information is gathered from the vehicle, only. Also, many of the existing Electronic Stability Program systems do not include determinations of whether a trailer is attached to the tow-vehicle.

Thus, a need exists for an electronic stability enhancing system using computer instructions on computer readable media for providing a direct assessment, a calculated response, and multiple actions that can be applied in real time to a prime mover connected to an auxiliary vehicle by gathering force and motion information directly from the prime mover and the auxiliary vehicle.

Further, a need exists for an electronic stability enhancing system that uses computer instructions and a computerized model, that includes information and inputs on prime mover and the auxiliary vehicle, such that the computer instructions of the electronic stability enhancing system can be used in determining a direct response, such as braking and throttling, or for assisting the driver to optimize the safe performance of the prime mover and the auxiliary vehicle combination.

The present embodiments of the invention meet these needs.

SUMMARY

The present embodiments relate generally to computer instructions on a computer readable medium for performing a method to assist with control, stability, and management of a prime mover connected to an auxiliary vehicle. A plurality of computer instructions can be stored on the computer readable medium, in which the computer instructions, when executed by a processor, cause the processor to perform the steps of the method for stabilizing the prime mover connected to the auxiliary vehicle.

The method can begin by connecting an auxiliary vehicle to a prime mover with an auxiliary stability enhancing system and an electronic stability enhancing system. The stability enhancing systems, including the electronic stability enhancing system and the auxiliary stability enhancing system, can include a computer with at least one processor with a memory having computer instructions stored thereon for instructing communications between the processor and a plurality of sensors and communications between the processor and a database storage.

The plurality of sensors can be located on the prime mover and the auxiliary vehicle. The database storage can be located on the prime mover and the auxiliary vehicle and can contain specifications representing the prime mover and specifications representing the auxiliary vehicle.

The embodiments include an on-board computer having at least one processor that can be located on the prime mover and can communicate with a plurality of sensors, wherein the sensors can be located on the prime mover, the auxiliary vehicle, and combinations thereof, for detecting force values, motion values, and combinations thereof.

The at least one processor can communicate with a database storage containing specifications representing the prime mover and specifications representing the auxiliary vehicle for conducting comparative analyses of at least one detected force value, at least one detected motion value, and combinations thereof, with the specifications. Computer instructions can instruct the performance of the comparisons to determine if a detected at least one force value, a detected at least one motion value, and combinations thereof, exceed known preset threshold values, or preset limits, for the prime mover connected to the auxiliary vehicle.

A preset limit or threshold value can be a limit that has been preinstalled in the memory of the electronic stability enhancing system, wherein the preinstalled limit is based on specifications of the prime mover, the auxiliary vehicle, or the prime mover and the auxiliary vehicle assembly, and the preset limit should not be exceeded during towing.

Then, computer instructions on computer readable media can instruct the method step of calculating a response and selectively applying the response to try to reduce the force values or motion values that exceed or can exceed the preset threshold values. For example, computer instructions on computer readable media can instruct the method step of selectively applying braking to at least one wheel of the prime mover and/or auxiliary vehicle to reduce detected force values, detected motion values, and combinations thereof, which exceed, or are about to exceed, the preset threshold values for the prime mover connected to the auxiliary vehicle.

Next, the computer readable medium with the computer instructions can instruct the calculation of an adjustment value to reduce a force value or a motion value for the prime mover connected to the auxiliary vehicle that continues to exceed a preset limit. This calculated adjustment or reduction value can alter the detected at least one force value, the detected at least one motion value, and combinations thereof. Then, computer instructions can provide instructions for calculating a further adjustment or reduction value if the reduced force, motion, and combinations thereof, cause excessive motions of the prime mover connected to the auxiliary vehicle, such as excessive yaw, pitch, roll, sway, sliding, jackknifing, and combinations thereof.

BRIEF DESCRIPTION OF THE DRAWINGS

The detailed description will be better understood in conjunction with the accompanying drawings as follows.

Figure 1:
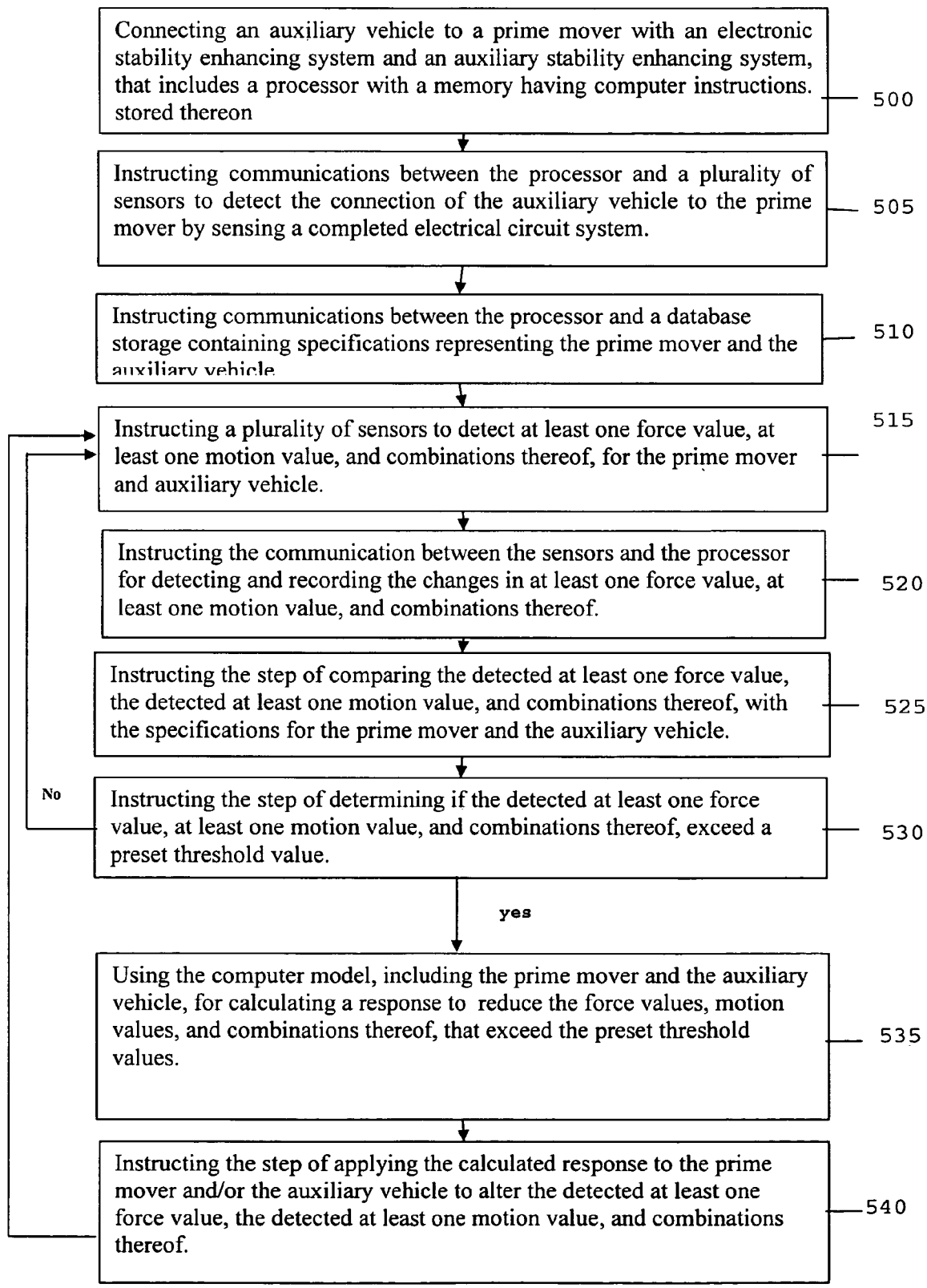
FIG. 1 depicts a flow diagram of an embodiment using computer instructions on computer readable media to instruct the steps of a method for assisting with stabilizing a prime mover connected to an auxiliary vehicle.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that the embodiments can be practiced or carried out in various ways.

The present embodiments relate generally to a computer readable medium having computer instructions stored thereon for performing a method to assist with control, stability, and management of a prime mover connected to an auxiliary vehicle. A plurality of computer instructions can be stored on the computer readable medium, in which the computer instructions, when executed by a processor, cause the processor to perform the steps of the method for stabilizing the prime mover connected to the auxiliary vehicle.

The embodiments of the invention provide the benefit of a computer program that instructs the performance of a method for improved, electronic stability and control for handling, steering, and stabilizing a prime mover connected to an auxiliary vehicle. The embodiments provide computer instructions for a method which may reduce crash risks and cargo spillage on roadways, including spillage of hazardous cargo on roadways pulled in tandem auxiliary vehicles by trucks or other prime movers, in some situations. The embodiments include computer instructions to instruct responses in real time to reduce swaying, rolling, sliding, and jackknifing of the auxiliary vehicle connected to a prime mover, in some situations.

The computer readable medium includes computer instructions stored thereon for causing a processor to perform the embodiments of the method for stabilizing a prime mover connected to an auxiliary vehicle, in which the method includes connecting an auxiliary vehicle to a prime mover using an auxiliary stability enhancing system and an electronic stability enhancing system.

The stability enhancing systems, including the electronic stability enhancing system and the auxiliary stability enhancing system, includes a computer having at least one processor with a memory having computer instructions stored thereon for instructing communications. The communications can be between the processor and a plurality of sensors and/or between the processor and a database storage. The plurality of sensors can be located on the prime mover and on the auxiliary vehicle. The database storage can be located on the prime mover, and the database can contain specifications representing the prime mover and specifications representing the auxiliary vehicle.

A prime mover usable in the embodiments of the computer program can be: a passenger car, a tractor, a sport utility vehicle (SUV), a van, a recreational vehicle, a bus, a pick-up truck or other truck with a gross vehicle weight rating (GVWR) of less than or equal to 20,000 pounds, a medium or heavy truck with a gross vehicle weight rating (GVWR) range of over 20,000 pounds, a semi-truck, or other motorized vehicle. Semi-trucks can be connected to or can tow semi-trailers or tandem trailers. Examples of manufacturers of semi-trucks include: Volvo, Peterbilt, Kenworth, and other semi-truck manufacturers.

The prime mover includes a brake adjacent to each wheel of the tow-vehicle, such as an electric brake manufactured by Visteon Corporation of Van Buren Township, Mich., a surge brake manufactured by U-Haul Corporation of Phoenix, Ariz., a hydraulic brake manufactured by Bosch Corporation of Chicago, Ill., a pneumatic brake manufactured by Bendix Corporation of Frankfort, Ky., and combinations thereof.

The embodiments include the prime mover towing an auxiliary vehicle, in which the auxiliary vehicle can be: an equipment trailer such as a Millennium heavy equipment trailer, a utility trailer such as a Millennium utility trailer, a tandem trailer such as a Titan tandem axle cargo trailer, an enclosed trailer such as a Titan enclosed gooseneck trailer, a work trailer such as a Millennium dump trailer for hauling dirt, a horse trailer such as an Exiss horse trailer, a car hauler trailer such as a Featherlite and Pace car hauler trailer or a Featherlite race car trailer, a motorcycle trailer such as a Haulmark motorcycle trailer, a Coleman pop-up trailer, a recreational trailer such as an Airstream recreational trailer, a house trailer made by such manufacturers as American Homestar Homes, a boat trailer such as a Donzi or Shorelander boat trailer, a semi-trailer such as a Fruehauf Transport Trailer or a Fruehauf Tanker Trailer, a commuter car, a cart such as a golf cart, or other trailers having at least two wheels.

The auxiliary vehicle can include a brake adjacent to at least one wheel of the auxiliary vehicle. In an alternative embodiment, the auxiliary vehicle can be without wheels.

The plurality of sensors can be located on the prime mover for communications with the processor and the electronic stability enhancing system. The plurality of sensors can be located on the auxiliary vehicle, as well. An embodiment of the computer program includes the computer readable medium having computer instructions for instructing the step of verifying that the plurality of sensors are operational after completing the step of connecting the auxiliary vehicle to the prime mover. Computer instructions can instruct the plurality of sensors, or certain sensors, to detect a completed electrical circuit, other integrated circuit systems, and combinations thereof, between the prime mover and the auxiliary vehicle by using a device in communication with one or more of the plurality of sensors. An example of a device that can be used to detect the presence of a connection with the auxiliary vehicle and the prime mover can be a voltmeter to measure voltage or an ohm meter to detect resistance.

The sensors on the prime mover can communicate with the auxiliary vehicle lighting system by detecting the completed electrical circuit, when the lighting system of the auxiliary vehicle is connected to, or plugged into, the lighting system of the prime mover. For example, the lighting system of the auxiliary vehicle can include a wiring harness with a plug that, when connected to the wiring harness of the prime mover, provides a resistance that can be detected, when the connection is completed.

In an alternative embodiment, sensors located on the auxiliary vehicle can be wireless sensors that can communicate directly with the processor of the electronic stability enhancing system located on the prime mover via a wireless system.

The embodiments include a computer with at least one processor that can be located on the prime mover and can communicate with a plurality of sensors located on the prime mover, the auxiliary vehicle, and combinations thereof, to detect force values, motion values, and combinations thereof.

Examples of these sensors can include a proximity braking sensor manufactured by Bently Nevada of Houston, Tex., for providing information on the motion of a brake shoe in braking applications, a position sensor manufactured by Systron Donner of Concord, Calif., for sensing a position of the brake shoe relative to the sensor as an indication of the application of the braking system, and a position sensor manufactured by Bently Nevada of Houston, Tex., for sensing a wheel placement in relation to the control arm regarding suspension characteristics of the prime mover and auxiliary vehicle.

Other examples of sensors usable herein can be force sensors manufactured by Sensor Developments, Incorporated of Orion, Mich., and Futek of Irvine, Calif., which can be used to provide information to regulate lateral forces, vertical forces, circumferential forces, and coupling forces on the prime mover and auxiliary vehicle including: a lateral force, a braking force on the assembly, or a side wind gust force.

Force sensors on the prime mover and on the auxiliary vehicle can provide input for maintaining centers of gravity to prevent rollover with respect to the prime mover and auxiliary vehicle combination. Motion sensors can be used to provide information with regard to translational motions and angular motions of the prime mover and auxiliary vehicle combination. For example, translational motions can include lateral acceleration and deceleration motions, and angular motions can include yaw angle, yaw rate, pitch angle, pitch rate, and roll rate. The input from the sensors and the resulting computer instructions, along with optimization regarding specifications and characteristics of the prime mover and auxiliary vehicle combination, can reduce motions of the combination, such as sway, pitch, roll, yaw, and combinations thereof. This will provide a more optimized and improved electronic stability enhancing control system.

More examples of sensors that are usable herein, include motion sensors, such as displacement sensors, velocity sensors, or acceleration/deceleration sensors.

Displacement sensors, such as a string potentiometer, made by Space Age Corporation can be included to provide information on the angle between the trailer and the tow-vehicle.

Systron Donner of Concord, Calif., provides velocity sensors that are, for example, roll rate transducers and yaw rate transducers for monitoring the yaw, roll, and pitch velocities. These sensors can be used to provide information on motion relative to braking or wheel movement.

Acceleration sensors, such as lateral or longitudinal accelerometers made by Systron Donner, provide acceleration information on the tow-vehicle regarding lateral acceleration or longitudinal acceleration.

Other examples of sensors include wheel speed sensors manufactured by Systron Donner of Concord, Calif., and Bently Nevada of Houston, Tex., that can be used for providing information on the prime mover and auxiliary vehicle combination speed and acceleration/deceleration.

Another example of a sensor that can be included in an embodiment can be a yaw sensor. Yaw sensors can be used for providing information regarding rotary movements of the prime mover and auxiliary vehicle combination and for altering the spin or plow motions of either the prime mover or the auxiliary vehicle.

Other examples of sensors usable herein are torque sensors and steering wheel angle sensors. Torque sensors can be manufactured by Systron Donner of Concord, Calif., and Futek of Irvine, Calif., for providing information on braking or wheel traction. Steering wheel angle sensors can be manufactured by Systron Donner of Concord, Calif., and can provide information concerning the steering torque in a given maneuver of the prime mover and auxiliary vehicle combination.

The embodiments include a computer readable medium having computer instructions stored thereon to cause a processor to communicate with the plurality of sensors, located on the prime mover, the auxiliary vehicle, and combinations thereof, for the purpose of detecting at least one force value, at least one motion value, and combinations thereof. Computer instructions can be used to cause the processor to communicate with a database storage containing specifications representing the prime mover and specifications representing the auxiliary vehicle for conducting comparative analyses with the detected at least one force value, the detected at least one motion value, and combinations thereof.

Computer instructions can instruct the performance of the comparisons for determining if the detected at least one force value, detected at least one motion value, and combinations thereof, exceed any of the preset threshold values, or preset limits, for the prime mover connected to the auxiliary vehicle. If the detected at least one force value, detected at least one motion value, and combinations thereof, can exceed or have exceeded the preset threshold values, then a response can be calculated and selectively applied to reduce the force value, motion value, or combination thereof.

For example, the computer instructions can adjust the engine power of the prime mover to alter the at least one motion value, the at least one force value, or combinations thereof, for the prime mover connected to the auxiliary vehicle.

Specifications on the prime mover can include such characteristics as: prime mover length, prime mover height, prime mover width, prime mover weight, prime mover inertia value, prime mover wheel configurations, prime mover tire characteristics, prime mover suspension characteristics, and combinations thereof.

Specifications on the auxiliary vehicle include such characteristics as: auxiliary vehicle length, auxiliary vehicle width, auxiliary vehicle height, auxiliary vehicle weight, auxiliary vehicle configurations, auxiliary vehicle wheel sizes, auxiliary vehicle wheel diameters, auxiliary vehicle tire characteristics, auxiliary vehicle suspension characteristics, auxiliary vehicle dimensional characteristics, auxiliary vehicle inertia values, and combinations thereof.

Auxiliary vehicle dimensional characteristics can include information on where the wheels are located relative to the point of connection of the auxiliary vehicle to the prime mover. Auxiliary vehicle tire characteristics can include force and moment characteristics which describe how a tire works and how forces are generated on the tires by such motions relating to the cornering of the tires, angles of the tires in relation to the ground, air content and stiffness of the tire, and other such parameters. Auxiliary vehicle suspension characteristics include the placement of the wheels and how a wheel moves with the forces exerted on the wheel, which can involve other characteristics such as shock absorber characteristics and other suspension part characteristics. Auxiliary vehicle wheel configuration refers to the number of tires and where each tire is located in relation to the other tires. For example a semi-truck can have a dual tire configuration, whereas a car would have a single tire configuration.

The preset limit referred to in the invention is the limit that has been preinstalled in the memory of the electronic stability enhancing system and the auxiliary stability enhancing system, wherein the preinstalled limit is based on specifications of the prime mover, the auxiliary vehicle, or the prime mover and auxiliary vehicle combination, and the preset limits should not be exceeded during towing or the system will engage.

Accordingly, the computer readable medium with the computer instructions can instruct the step of calculating a response to reduce a detected force value or a detected motion value, when the detected force or motion values has exceeded the preset threshold value or preset limit. The computer instructions are used with a computer model, that includes the specifications and characteristics of the prime mover and the auxiliary vehicle, for calculating the response.

Then, the computer model and compute instructions are used to determine where on the prime mover and/or auxiliary vehicle the calculated response is to be applied to assist with stability and control of the prime mover connected to the auxiliary vehicle.

For example, computer instructions can instruct the step of selectively applying braking, throttling, or other forces to at least one wheel of the prime mover and/or the auxiliary vehicle to reduce the detected force value, the detected motion value, and combinations thereof, that exceed the preset threshold value for the combination of the prime mover connected to the auxiliary vehicle. Certain embodiments include computer instructions for optimizing the specifications representing the prime mover and the specifications representing the auxiliary vehicle to reduce such motions as yaw, pitch, roll, sway, sliding, jackknifing, and combinations thereof, of the prime mover connected to the auxiliary vehicle, in some situations.

Next, in an embodiment, the computer readable medium with the computer instructions can instruct the calculation of an adjustment value for the prime mover connected to the auxiliary vehicle. This adjustment value can be calculated and applied to adjust the detected at least one force value, the detected at least one motion value, and combinations thereof, that exceed the preset threshold values for the prime mover connected to the auxiliary vehicle. The adjustment value can include: a braking force value, a braking pressure value, a wheel speed value, a translational motion value, an angular motion value, a coupling force value, a steering input value, a steering torque value, a steering rate value, a wheel angle value, a vehicle speed value, a lateral force value, a throttle position value, a brake pedal position value, and combinations thereof.

Certain embodiments of the computer program can include computer instructions for calculating a further adjustment if the reduced force, motion, and combinations thereof, cause excessive motions, such as yaw, pitch, rolling, sliding, swaying, jackknifing, other dangerous motions, and combinations thereof, of the prime mover connected to the auxiliary vehicle.

Certain embodiments for assisting with the stabilizing and control of the combination prime mover connected to the auxiliary vehicle can include computer instructions for using auxiliary vehicle inertia values for correcting steering and handling of the combination and to possibly restore stabilization of the combination. Auxiliary vehicle inertia values can include: a roll value, a yaw value, a pitch value, a braking value, a wheel speed value, and combinations thereof.

FIG. 1 depicts a flow diagram of an embodiment using computer instructions on computer readable media to instruct the steps of a method for stability enhancement of a prime mover connected to an auxiliary vehicle.

The embodiments include connecting an auxiliary vehicle to a prime mover with an electronic stability enhancing system and an auxiliary stability enhancing system (Step 500). The auxiliary stability enhancing system and the electronic stability enhancing system can include at least one processor with a memory having computer instructions stored thereon.

The computer instructions can instruct communications between the processor and a plurality of sensors to detect the connection of the auxiliary vehicle to the prime mover by sensing a completed electrical circuit system or other integrated circuit system between the prime mover and the auxiliary vehicle (Step 505). The plurality of sensors can be located on the prime mover and on the auxiliary vehicle.

The computer instructions can instruct communications between the processor and a database storage (Step 510). The database storage can contain specifications representing the prime mover and specifications representing the auxiliary vehicle.

Computer instructions can be used to instruct a plurality of sensors to detect a change in at least one force value, at least one motion value, and combinations thereof, for the prime mover connected to the auxiliary vehicle. For example, the sensors can detect a change in force or motion when a driver, positioned within the prime mover connected to the auxiliary vehicle, turns the steering wheel of the prime mover and pushes the brake pedal of the prime mover (Step 515).

Computer instructions can instruct the communication between the plurality of sensors and the at least one processor for detecting and recording the changes in, or reducing, the at least one force value, the at least one motion value, and combinations thereof, for the prime mover connected to the auxiliary vehicle (Step 520).

Next, computer instructions can instruct the step of comparing the detected at least one force value, the detected at least one motion value, and combinations thereof, with the specifications representing the prime mover and the specifications representing the auxiliary vehicle (Step 525).

Computer instructions can instruct the step of determining if the detected at least one force value, the detected at least one motion value, and combinations thereof, exceed a preset threshold value, or preset limit, for the prime mover connected to the auxiliary vehicle (Step 530). For example, turning the steering wheel sharply and too far to the left when turning the combination prime mover connected to the auxiliary vehicle can create a large angular motion between the prime mover and the auxiliary vehicle which can cause the wheel angles to exceed their threshold values for the prime mover connected to the auxiliary vehicle and result in a loss of control, in some situations.

If the detected at least one force value, the detected at least one motion value, and combinations thereof, do not exceed a preset threshold value, or preset limit, for the prime mover connected to the auxiliary vehicle, then computer instructions instruct the plurality of sensors to continue monitoring and detecting force values, motion values, and combinations thereof, for the prime mover connected to the auxiliary vehicle (515).

If the detected at least one force value, the detected at least one motion value, and combinations thereof, exceed a preset threshold value, or preset limit, for the prime mover connected to the auxiliary vehicle, then computer instructions can instruct the step of calculating a response to reduce the detected force values and the detected motion values that exceed, or are about to exceed, the preset threshold values (Step 535). For example, computer instructions can be used with a computer model of the prime mover and the auxiliary vehicle for calculating a response to reduce or alter the effect of a steering wheel angle value, or other characteristic, by applying braking force to a wheel by the calculated amount.

Then, computer instructions can use the computer model of the prime mover with the connected auxiliary vehicle for determining where on the prime mover and/or auxiliary vehicle the appropriate calculated response is to be applied. After the appropriate response is calculated and it is determined where to apply the response, then computer instructions can be used to provide instructions to the driver for selectively applying braking to at least one wheel of the prime mover and/or at least one wheel of the auxiliary vehicle to reduce the detected force values, the detected motion values, and combinations thereof, that have exceeded the preset threshold values for the combination of the prime mover and auxiliary vehicle (Step 540).

If further adjustments for stability and control of the prime mover connected to the auxiliary vehicle are not required, then the computer instructions can instruct the plurality of sensors to continue monitoring and detecting the force values and motion values for the prime mover and the auxiliary vehicle (Step 515).

Computer instructions can be used for calculating adjustments and further adjustments, in real time, to reduce such forces and motions as: yawing, sliding, rolling, swaying, jackknifing, and combinations thereof, of the prime mover connected to the auxiliary vehicle and to enhance stability and control of the prime mover connected to the auxiliary vehicle, in some situations.

While these embodiments have been described with emphasis on the embodiments, it should be understood that within the scope of the appended claims, the embodiments might be practiced other than as specifically described herein.

What is claimed is:

1. A computer readable medium having stored thereon a plurality of computer instructions, wherein the plurality of computer instructions include computer instructions which, when executed by a processor with a memory, cause the processor to perform the steps of a method for stabilizing a prime mover connected to an auxiliary vehicle, wherein the prime mover comprises an electronic stability enhancing system, wherein the electronic stability enhancing system comprises the processor with a memory, wherein the processor is in communication with a plurality of sensors and a database storage, wherein the database storage contains specifications representing the prime mover and specifications representing the auxiliary vehicle; and wherein the the computer readable medium comprises computer instructions for:

detecting at least one force value, at least one motion value, and combinations thereof, for the prime mover connected to the auxiliary vehicle, using the plurality of sensors;

comparing the detected force value, the detected motion value, and combinations thereof, with the specifications representing the prime mover and the specifications representing the auxiliary vehicle to determine if the detected force value or the detected motion value for the prime mover and the auxiliary vehicle exceeds a preset threshold value for the prime mover connected to the auxiliary vehicle; and calculating a response to the exceeded preset threshold value using the specifications and characteristics of the prime mover and the auxiliary vehicle stored in the database; selectively applying braking, based on the calculated response, to at least one wheel of the prime mover to reduce the detected force value or the detected motion value that exceeds the preset threshold value for the prime mover connected to the auxiliary vehicle.

2. The computer readable medium of claim 1, further comprising computer instructions for verifying that the plurality of sensors are operational after connection of the auxiliary vehicle to the prime mover.

3. The computer readable medium of claim 1, further comprising computer instructions for instructing a processor to apply braking to at least one wheel of the auxiliary vehicle.

4. The computer readable medium of claim 1, further comprising computer instructions for calculating an adjustment value for the prime mover connected to the auxiliary vehicle to adjust the detected at least one force value, the detected at least one motion value, and combinations thereof, wherein the adjustment value comprises a member selected from the group consisting of: a braking force value, a braking pressure value, a wheel speed value, a translational motion value, an angular motion value, a coupling force value, a steering input value, a steering torque value, a steering rate value, a wheel angle value, a vehicle speed value, a lateral force value, a throttle position value, a brake pedal position value, and combinations thereof.

5. The computer readable medium of claim 1, further comprising computer instructions for adjusting the selective braking if the reduced force, motion, and combinations thereof, of the prime mover connected to the auxiliary vehicle, cause excessive yaw, pitch, rolling, sliding, swaying, and combinations thereof.

6. The computer readable medium of claim 1, further comprising computer instructions for using the specifications representing the prime mover and the specifications representing the auxiliary vehicle to reduce sway, yaw, pitch, and roll of the prime mover connected to the auxiliary vehicle when at least one characteristic exceeds a preset limit.

7. The computer readable medium of claim 1, further comprising computer instructions for detecting a member selected from the group consisting of: a completed electrical circuit, other integrated circuit systems, and combinations thereof, between the prime mover and the auxiliary vehicle using a device in communication with at least one of the plurality of sensors on the prime mover.

8. The computer readable medium of claim 1, further comprising computer instructions for communicating directly with the processor located on the prime mover by using a wireless sensor.

9. The computer readable medium of claim 1, further comprising the computer instructions to use auxiliary vehicle inertia values for stabilizing the prime mover with the connected auxiliary vehicle, wherein the auxiliary vehicle inertia values comprise a member selected from the group consisting of: a roll value, a yaw value, a pitch value, a braking value, a speed value, and combinations thereof.

10. A computer readable medium having stored thereon a plurality of computer instructions, wherein the plurality of computer instructions include computer instructions which, when executed by a processor with a memory, cause the processor to perform the steps of a method for stabilizing a prime mover connected to an auxiliary vehicle, wherein the prime mover comprises an electronic stability enhancing system, wherein the electronic stability enhancing system comprises the processor with a memory, wherein the processor is in communication with a plurality of sensors and a database storage, wherein the database storage contains specifications representing the prime mover and specifications representing the auxiliary vehicle; and wherein the computer readable medium comprises computer instructions for:

detecting at least one force value, at least one motion value, and combinations thereof, for the prime mover connected to the auxiliary vehicle, using the plurality of sensors;

comparing the detected force value, the detected motion value, and combinations thereof, with the specifications representing the prime mover and the specifications representing the auxiliary vehicle to determine if the detected force value or the detected motion value for the prime mover and the auxiliary vehicle exceeds a preset threshold value for the prime mover connected to the auxiliary vehicle;

calculating a response to the exceeded preset threshold value using the specifications and characteristics of the prime mover and the auxiliary vehicle stored in the database; and selectively applying braking to at least one wheel of the prime mover, based on the calculated response, to reduce the detected force value or the detected motion value that exceeds the preset threshold value for the prime mover connected to the auxiliary vehicle; and calculating an adjustment using the specifications and characteristics of the prime mover and the auxiliary vehicle stored in the database for the selective braking if the reduced force, motion, and combinations thereof, of the prime mover connected to the auxiliary vehicle, cause excessive yaw, pitch, rolling, sliding, swaying, and combinations thereof.

11. The computer readable medium of claim 10, further comprising computer instructions for applying braking to at least one wheel of the auxiliary vehicle.

12. The computer readable medium of claim 10, further comprising computer instructions for calculating an adjustment value for the prime mover connected to the auxiliary vehicle to adjust the detected at least one force value, the detected at least one motion value, and combinations thereof, wherein the adjustment value comprises a member selected from the group consisting of: a braking force value, a braking pressure value, a wheel speed value, a translational motion value, an angular motion value, a coupling force value, a steering input value, a steering torque value, a steering rate value, a wheel angle value, a vehicle speed value, a lateral force value, a throttle position value, a brake pedal position value, and combinations thereof.

13. The computer readable medium of claim 10, further comprising computer instructions for adjusting the selective braking if the reduced force, motion, and combinations thereof, of the prime mover connected to the auxiliary vehicle, cause excessive yaw, pitch, rolling, sliding, swaying, and combinations thereof.

14. The computer readable medium of claim 10, further comprising computer instructions for using the specifications representing the prime mover and the specifications representing the auxiliary vehicle to reduce sway, yaw, pitch, and roll of the prime mover connected to the auxiliary vehicle when at least one characteristic exceeds a preset limit.

15. A computer readable medium having stored thereon a plurality of computer instructions, wherein the plurality of computer instructions include computer instructions which, when executed by a processor with a memory, cause the processor to perform the steps of a method for stabilizing a prime mover connected to an auxiliary vehicle, wherein the prime mover comprises an electronic stability enhancing system, wherein the electronic stability enhancing system comprises the processor with a memory, wherein the processor is in communication with a plurality of sensors and a database storage, wherein the database storage contains specifications representing the prime mover and specifications representing the auxiliary vehicle; and wherein the the computer readable medium comprises computer instructions for:

detecting at least one force value, at least one motion value, and combinations thereof, for the prime mover connected to the auxiliary vehicle, using the plurality of sensors;

comparing the detected force value, the detected motion value, and combinations thereof, with the specifications representing the prime mover and the specifications representing the auxiliary vehicle to determine if the detected force value or the detected motion value for the prime mover and the auxiliary vehicle exceeds a preset threshold value for the prime mover connected to the auxiliary vehicle; and calculating a response using the specifications representing the prime mover and the specifications representing the auxiliary vehicle stored in the database when the detected motion value of the prime mover and the auxiliary mover exceeds a preset threshold, wherein the response comprises selectively applying a braking force to the prime mover, increasing engine power of the prime mover, or decreasing engine power of the prime mover.

16. The computer readable medium of claim 15, further comprising computer instructions for applying braking to at least one wheel of the auxiliary vehicle.

17. The computer readable medium of claim 15, further comprising computer instructions for calculating an adjustment value for the prime mover connected to the auxiliary vehicle to adjust the detected at least one force value, the detected at least one motion value, and combinations thereof, wherein the adjustment value comprises a member selected from the group consisting of: a braking force value, a braking pressure value, a wheel speed value, a translational motion value, an angular motion value, a coupling force value, a steering input value, a steering torque value, a steering rate value, a wheel angle value, a vehicle speed value, a lateral force value, a throttle position value, a brake pedal position value, and combinations thereof.

18. The computer readable medium of claim 15, further comprising computer instructions for adjusting the selective braking if the reduced force, motion, and combinations thereof, of the prime mover connected to the auxiliary vehicle, cause excessive yaw, pitch, rolling, sliding, swaying, and combinations thereof.

19. The computer readable medium of claim 15, further comprising computer instructions for using the specifications representing the prime mover and the specifications representing the auxiliary vehicle to reduce sway, yaw, pitch, and roll of the prime mover connected to the auxiliary vehicle when at least one characteristic exceeds a preset limit.

20. The computer readable medium of claim 15, further comprising computer instructions for using the specifications representing the prime mover and the specifications representing the auxiliary vehicle to reduce sway, yaw, pitch, and roll of the prime mover connected to the auxiliary vehicle when at least one characteristic exceeds a preset limit.

\* \* \* \* \*